(12) United States Patent
Stokes et al.

(10) Patent No.: US 7,184,057 B2
(45) Date of Patent: Feb. 27, 2007

(54) SYSTEMS AND METHODS FOR PROVIDING COLOR MANAGEMENT

(75) Inventors: Michael D. Stokes, Eagle, ID (US); Adrian Secchia, Bellevue, WA (US)

(73) Assignee: Microsoft Corpoartion, Redmond, WA (US)

( * ) Notice: Subject to any disclaimer, the term of this patent is extended or adjusted under 35 U.S.C. 154(b) by 1124 days.

(21) Appl. No.: 10/179,823

(22) Filed: Jun. 24, 2002

(65) Prior Publication Data

US 2003/0234793 A1    Dec. 25, 2003

(51) Int. Cl.
 H04N 9/64   (2006.01)
 G09G 5/02   (2006.01)
 G03F 3/08   (2006.01)
 G06K 9/00   (2006.01)

(52) U.S. Cl. .................. 345/600; 345/603; 345/591; 382/167; 358/518

(58) Field of Classification Search ........ 345/589–591, 345/593, 597, 600–601, 604, 427, 603; 358/515, 358/518, 1.1, 1.6, 1.9, 2.1; 382/162–167
See application file for complete search history.

(56) References Cited

U.S. PATENT DOCUMENTS 6,307,961 B1 *  10/2001  Balonon-Rosen et al. .. 382/167
6,362,808 B1 *   3/2002  Edge et al. ................. 345/601

FOREIGN PATENT DOCUMENTS

WO    1 079 606 A2    2/2001

OTHER PUBLICATIONS

Bigorgne, E. et al., "A Local Color Descriptor for Efficient Scene-Object Recognition," *Proceedings 11th International Conference on Image Analysis and Processing*, Sep. 26-28, 2001, 440-445.
Heikkila, I., "Resolution Management in Image Reproduction: Part I—Characterization of the Resolution Profile of the Device," *J. Imaging Sci. Technology*, 2001, 45(5), 495-502.
Lavendel, L., "The Other Side of Color Management," *Proceedings of SPIE—Color Imaging: Device-Independent Color, Color Hard Copy, and Graphic Arts*, Jan. 29-Feb. 1, 1996, 2658, 246-252.
Miyamoto, T. et al., "Dynamic Color Allocation Method for Color-Mapped Displays," *1997 IEEE Pacific Rim Conference on Communications, Computers and Signal Processing, PACRIM. 10 Years Networking the Pacific Rim*, Aug. 20-22, 1997, vol. 1, 85-92.
Turtur, A. et al., "IDB: An Image Database System," *IBM J. Res. Development*, 1991, 35(1-2), 88-96.

(Continued)

*Primary Examiner*—Wesner Sajous
(74) *Attorney, Agent, or Firm*—Woodcock Washburn LLP

(57) ABSTRACT

Systems and methods are provided for color management in connection with a variety of computing devices having different color display characteristics. The X11 graphics platform is augmented to support color management systems, such as ICC, sRGB and scRGB, which begin and end with device dependent colors. CMYK color spaces as well as extended RGB color spaces within X11r6 are also supported, thus extending the X11r6 graphics platform to support any modem color management standard.

52 Claims, 11 Drawing Sheets

OTHER PUBLICATIONS

Urabe, H. et al., "Image-Designing and Color Management for Digital Still Camera and Printer System," *Final Program and Proceedings of the Third IS&T/SID Color Imaging Conference: Color Science, Systems and Applications*, Nov. 7-10, 1995, 178-181.

"Color management functions," *The Open Group X Project Team*, 1999, *XII, Release 6.4*, 79-126.

Quercia, V., "What color names can I use?," *Window System User's Guide*, 1993, 343-361.

* cited by examiner

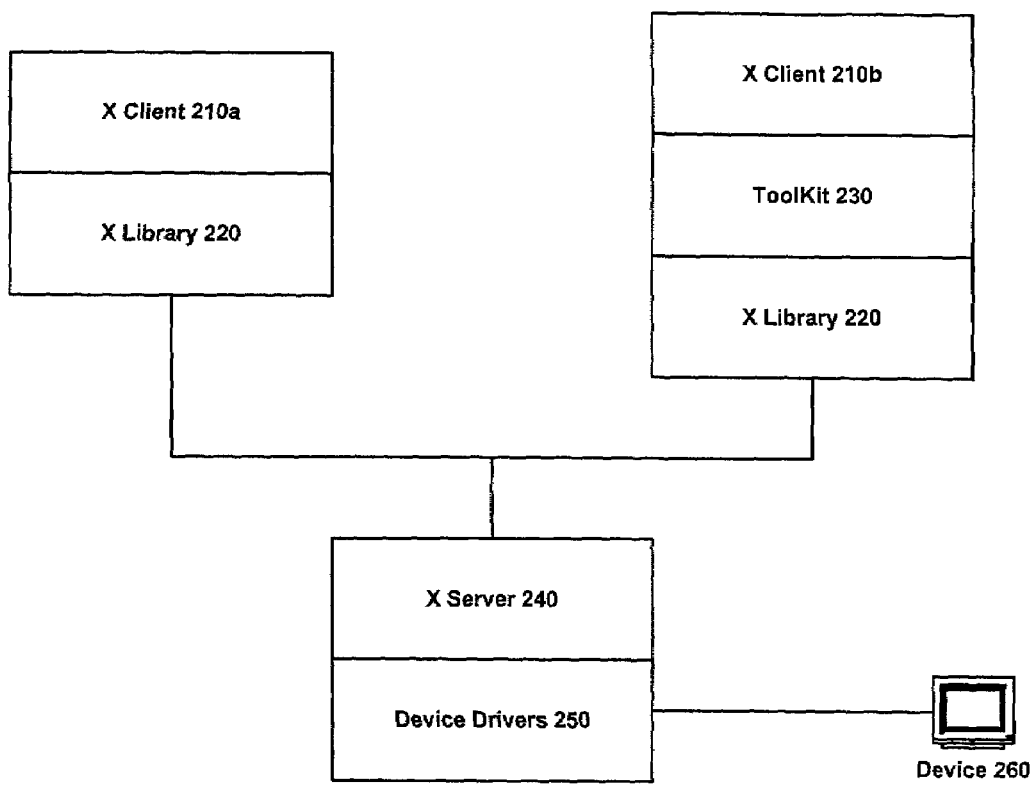
FIG. 1A - Prior Art
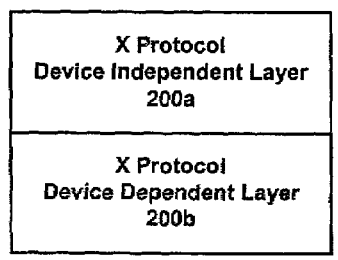
FIG. 1B - Prior Art

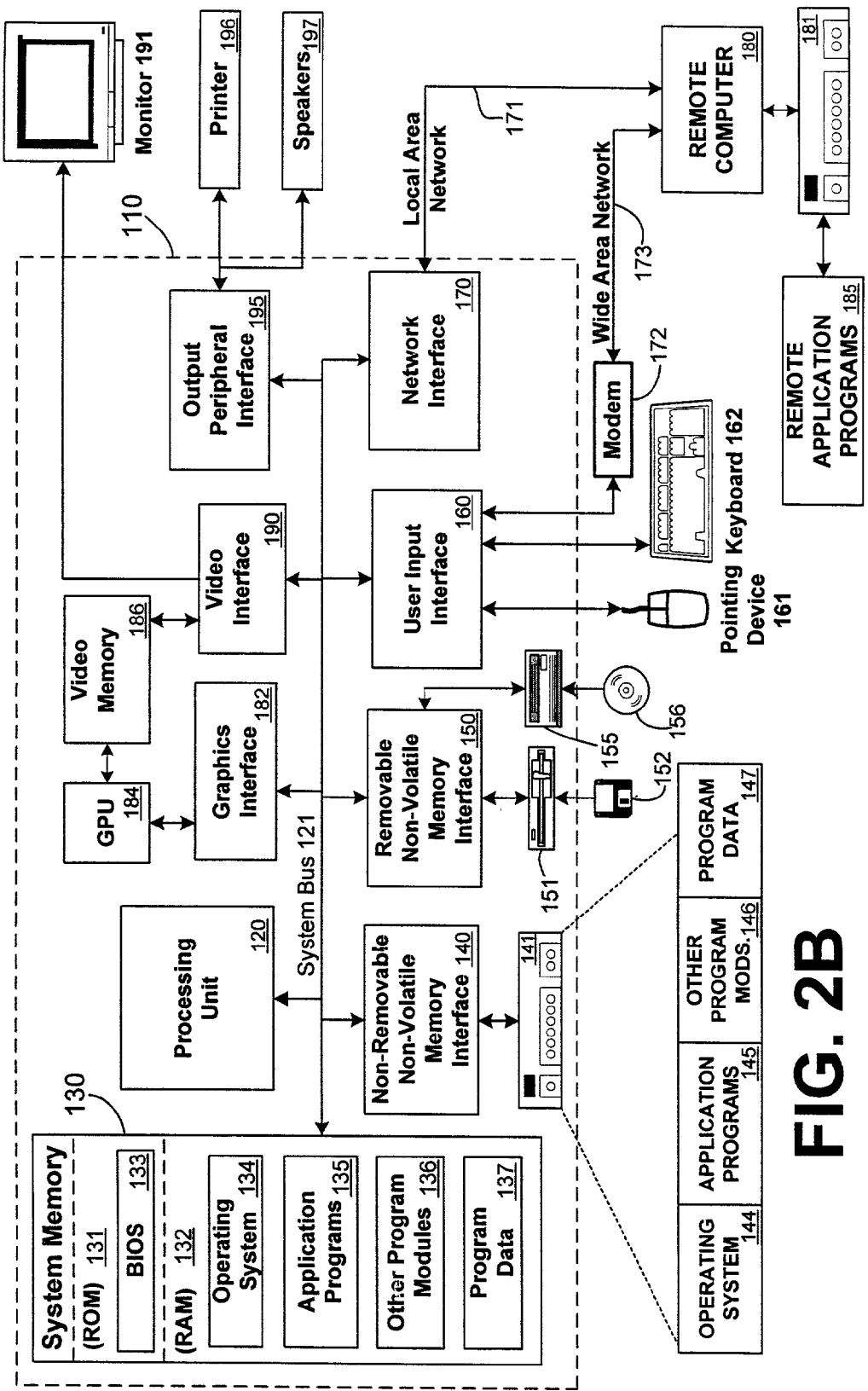

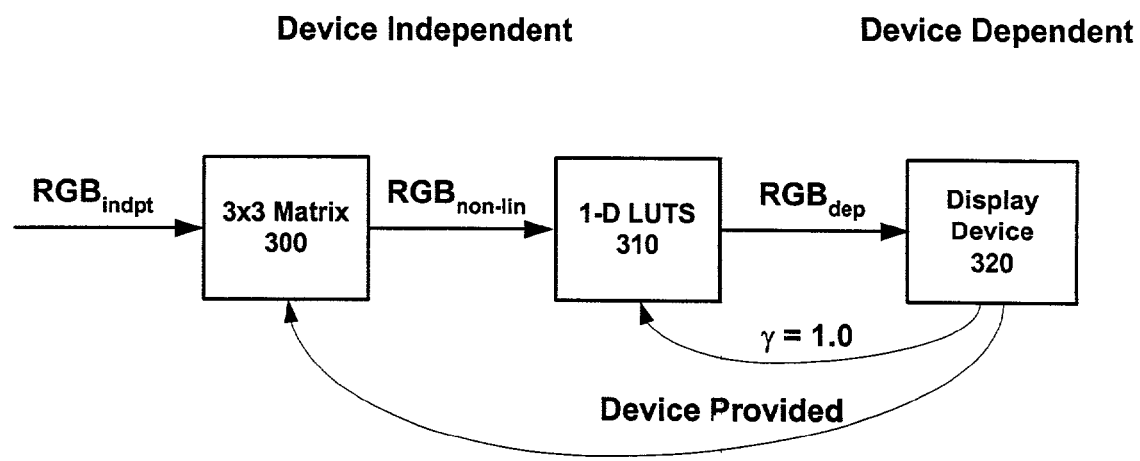
FIG. 3A - X11r5

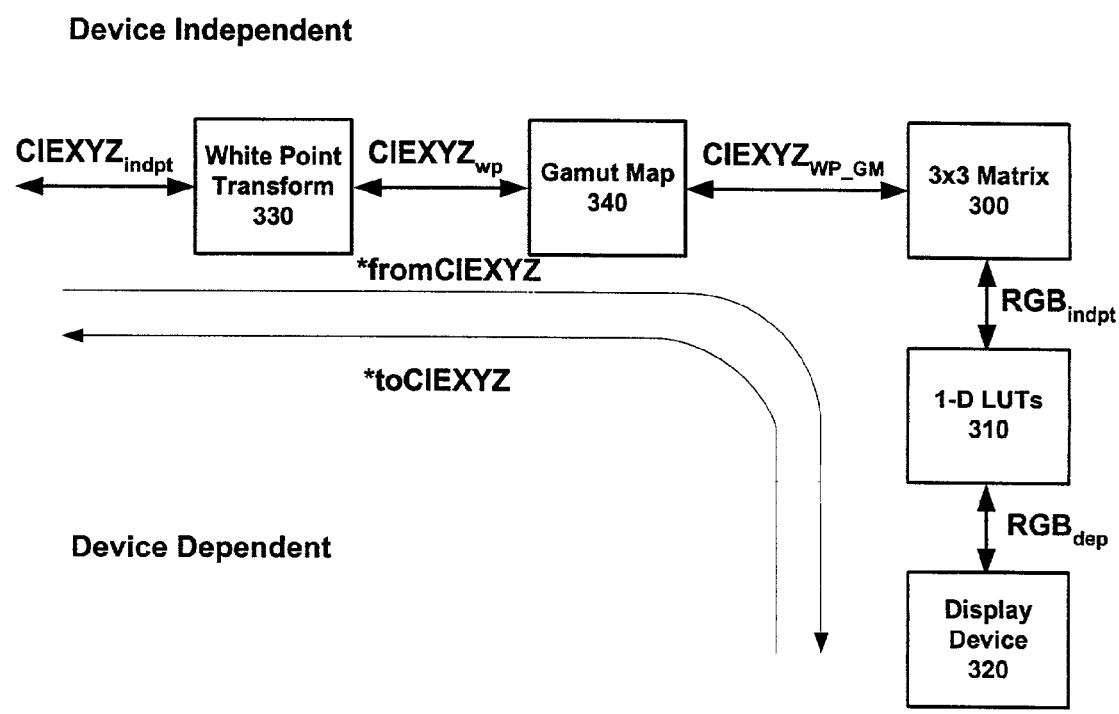
FIG. 3B - X11r6

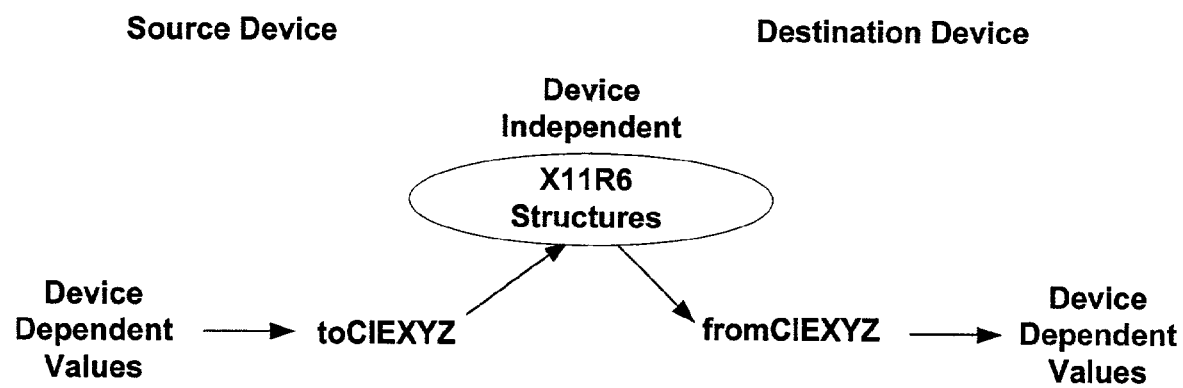
FIG. 4A - X11r6

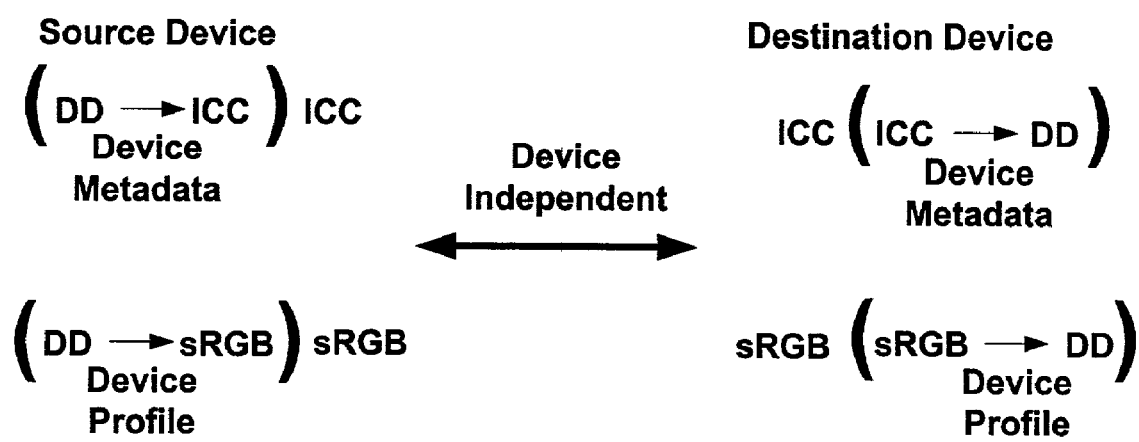
FIG. 4B - CMM

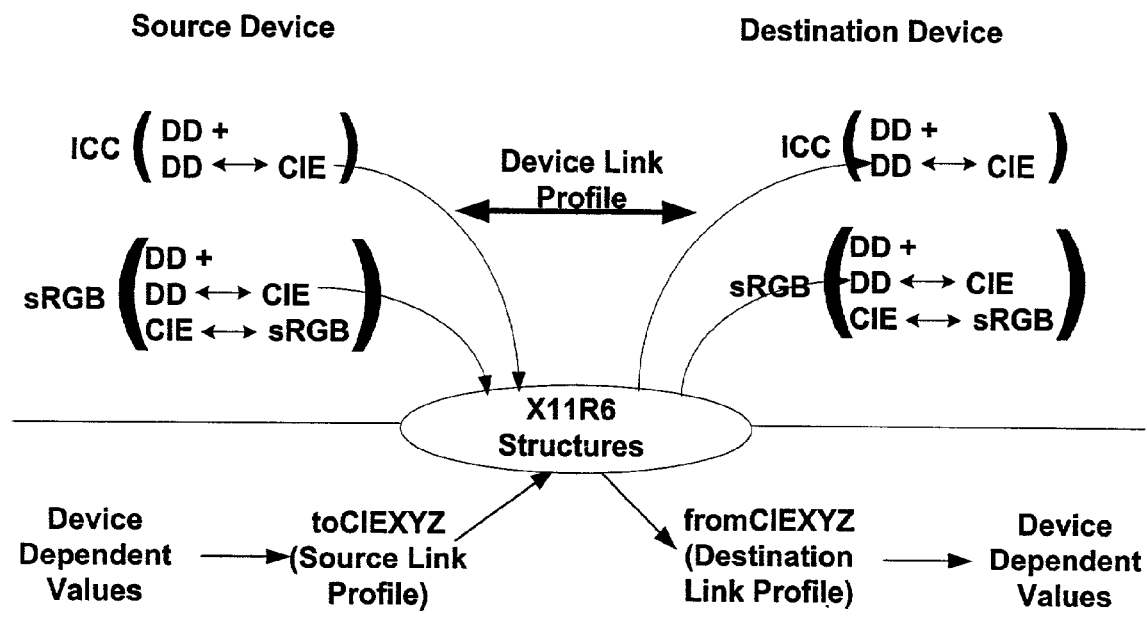
FIG. 4C - CMM and X11r6

SYSTEMS AND METHODS FOR PROVIDING COLOR MANAGEMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

The present invention is directed to systems and methods for providing color management. More particularly, the present invention is directed to systems and methods for providing color management in connection with a variety of devices having different color display characteristics.

BACKGROUND OF THE INVENTION

A color space is a model for representing color numerically in terms of three or more coordinates, e.g., the RGB color space represents colors in terms of the Red, Green and Blue coordinates.

For color to be reproduced in a predictable manner across different devices and materials, the color has to be described in a way that is independent of the specific behavior of the mechanisms and materials used to produce the color. For instance, color cathode ray tubes (CRTs) and color printers use very different mechanisms for producing color. To address this issue, current methods require that color be described using device independent color coordinates, which are then translated into device dependent color coordinates for each device. Presently, the device itself provides the mechanism for translation into the device dependent system.

In this regard, color management is a term that describes a technology or system that translates the colors of an object, e.g., images, graphics or text, from their current color space to the color space of the output devices like monitors, printers, and the like.

Early on, operating systems supported color by declaring support for a particular color space, e.g., RGB; however, since RGB varies between devices, color was not reliably reproduced across different devices.

Since such traditional means of color support were inadequate, various operating systems added support for using International Color Consortium (ICC) profiles to characterize device dependent colors in a device independent way. The ICC device characterization profile specification is publicly available and may be obtained, for instance, from the ICC web site, i.e., www.color.org. ICC uses the profiles of the input device that created an image and the output device that displayed the image and creates a transform that moves the image from the input device's color space to the output device's color space. While this resulted in very accurate color, it also involves the overhead of transporting the input device's profile with the image and running the image through the transform.

Further techniques were then developed in an attempt to provide intermediate device independent standardized color spaces. Some of these color management techniques already exist in operating systems and applications today, such as MICROSOFT® WINDOWS® operating systems and MICROSOFT® OFFICE® platforms. Color spaces other than the ICC color space include the standard color space, or sRGB for short (International Engineering Consortium (IEC) Specification No. 61966-2-1), which has been supported as a core technology beginning with WINDOWS98® and OFFICE2000®. Color management techniques have continued to evolve through the authoring of the standard extended color space, or scRGB for short (IEC Spec. No. 61966-2-2).

With integration of ICC, sRGB and scRGB, there are a number of issues that require resolution when it comes to the various types of input and output computing devices that support color. Currently, sRGB is the default color space in Windows, based on the IEC 61966-2-1 standard. An sRGB-compliant device does not have to provide a profile or other support for color management to work well.

In this regard, the structures of the sRGB, scRGB and ICC color spaces have a fixed and definite meaning, and are background to the invention. While reference to these color spaces has meaning that constitutes sufficient identification to anyone of ordinary skill in the art, a generic description nonetheless follows, and may be supplemented by any of the publicly available standards specification for the respective color spaces.

The standard RGB color space, sRGB, includes 1-D Look Up Tables (LUTs) describing nonlinear relationships between the tonal response of RGB perceptual space and physical luminance space, such as CIEXYZ, a 3×3 matrix describing red, green and blue primaries as they relate to CIEXYZ values, white point value in perceptual terms, such as D65 for a CIEXYZ standard correlating to daylight as a color temperature of 6500 Kelvin and optional viewing conditions such as surround, background, brightness that impact an end user's perception of the target device colors.

The standard extended color space, scRGB, is the same as sRGB, but the values can extend outside of the visual range of colors.

An ICC profile is typically a metadata structure that includes information relating device dependent colors to their equivalent human visually perceived colors. Some instances of ICC profiles can also provide translation information between any two color spaces, whether device dependent or device independent.

The X Protocol was developed in the mid 1980's in response to the need to provide a network transparent graphical user interface (GUI) primarily for the UNIX operating system. X provides for the display and management of graphical information, much in the same manner as MICROSOFT® WINDOWS® and IBM®'S Presentation Manager.

The key difference between the X architecture and the color management techniques of other platforms is in the structure of the X Protocol. Whereas WINDOWS® and other platforms, such as IBM's Presentation Manager, simply display graphical applications local to the PC, the X Protocol distributes the processing of applications by specifying a client-server relationship at the application level. The "what to do" part of the application is called an X client and is separated from the "how to do" part, the display, called the X server. X clients typically run on a remote machine, which has excess computing power and displays on an X server. The benefit is true client-server and distributed processing.

As illustrated in FIG. 1A, the X Protocol defines a client-server relationship between an application 210a, 210b and its display 240. To meet this, the application 210a, 210b, called an X client, is divorced from the display, known as the X server 240. The X clients 210*a*, 210*b* include an X library 220, and optionally a toolkit 230. X server 240 includes device drivers 250 for driving a device 260. As shown in FIG. 1B, X further provides a common windowing system by specifying both a device dependent 200*b* and an independent layer 200*a*, and basing the protocol on an asynchronous network protocol for communication between an X client 210 and X server 240. In effect, the X Protocol hides the peculiarities of the operating system and the underlying hardware. This masking of architectural and engineering differences simplifies X client development and provides the springboard for the X Window System's high portability.

Advantages of the X approach include: (1) local and network based computing look and feel the same to both the user and the developer, (2) the X server is highly portable allowing support for a variety of languages and operating systems, (3) X clients also have a high degree of portability, (4) X can support any byte stream oriented network protocol, local or remote and (5) applications do not suffer a performance penalty.

Thus, the design of the X Protocol specifies a client-server relationship between an application and its display. In X, the software that manages a single screen, keyboard and mouse is known as an X server. An X client is an application that displays on the X server and is sometimes referred to as "the application." The X client sends requests, e.g., a drawing or information request, to the X server. The X server accepts requests from multiple clients and returns replies to the X client in response to information requests, user input and errors.

The X Server runs on the local machine and accepts and demultiplexes network based or local interprocess communication (IPC) based X client requests and acts upon them. The X server (1) displays drawing requests on the screen, (2) replies to information requests, (3) reports error(s) in a request, (4) manages the keyboard, mouse and display device, (5) multiplexes keyboard and mouse input onto the network, or via local IPC, to the respective X clients, (6) creates, maps and destroys windows and (7) writes and draws in windows.

The X Client is essentially an application written with the aid of libraries, e.g., Xlib and Xt, that take advantage of the X Protocol. The X Client (1) sends requests to the server, (2) receives events from server and (3) receives errors from the server.

With respect to requests, X clients make requests to the X server for a certain action to take place, e.g., create window. To enhance performance, the X client normally neither expects nor waits for a response. Instead, the request is typically left to the reliable network layer to deliver. X requests are any multiple of 4 bytes.

With respect to replies, the X server responds to certain X client requests that require a reply. It is noted that not all requests require a reply. X replies are any multiple of 4 bytes with a minimum of 32 bytes.

With respect to events, the X server forwards to the X client an event that the application is expecting, including keyboard or mouse input. To minimize network traffic, only expected events are sent to X clients. X events are 32 bytes.

With respect to errors, the X server reports errors in requests to the X client. Errors are like an event but are handled differently. X errors are the same size as events to simplify their handling. They are sent to the error handling routine of the X client as 32 bytes.

The design of an X server depends greatly upon the platform hardware and operating system on which it is implemented. As the capabilities of the underlying technologies have increased, so have the power and capabilities of the X server.

As mentioned, FIG. 1A illustrates that there is a device dependent layer 200*b* of the X protocol and a device independent layer 200*a*. The device dependent layer 200*b* is responsible for localizing the X server to the native environment, be it WINDOWS or Solaris and for swapping bytes of data from machines with differing byte ordering, and byte ordering is noted in each X request. Layer 200*b* hides the architectural differences in hardware and operating systems and also maintains device driver dependencies for the keyboard, mouse and video.

For a single threaded architecture, the X server is a single sequential process using the native time-slice architecture for scheduling demultiplexing requests, multiplexing replies, events and errors among X clients.

For a multithreaded architecture, the X server is a multithreaded process capable of exploiting the nature of the operating system by breaking jobs into multiple threads for the operating system and hardware to perform. True preemptive multitasking, multithreaded environments offer a high degree of power for the X server.

Today's X Servers include workstations, X terminals and PC X servers. Workstations are powerful enough to handle complex computing requirements and usually display local X clients and a small percentage of network (remote) X clients. X Terminals are dumb terminals with graphics capability. X server software is downloaded from a host. X terminals are less expensive than workstations and simpler to maintain. PC X Servers integrate PC and remote application server access into one common desktop, leverage existing PC investment and user skill sets (desktop manipulation and access), provide local or remote window management at the user's preference and are easy to use.

The X Consortium established the X11 graphics architecture. Over the last several years, the desktop has evolved from a productivity or user-centric environment to one focused on centralized administration surrounded by the adaptation of Web protocols and a browser based user interface. The latest release of the X Window System from the X Consortium—X11R6.5.1, or X11 or X11R6 for short—has addressed the issues of integrating X applications and browsers enabling rapid deployment without re-coding and security.

The most recent release of the X11 graphics architecture is publicly available on the World Wide Web, at least from the X Consortium, www.x.org. In short, the X11R6 color management system is a graphics protocol, which, via operations including white point adaptation, gamut mapping, matrix conversions and one dimensional (1-D) Look Up Tables (LUTs), (1) supports color management functions that are pluginable and (2) supports translation of device independent application content to device dependent color values.

When the X Consortium established X11, X11 supported a very simple color management mechanism to convert between standard RGB colors to specific display device RGB colors using a 3×3 matrix and 3 1-D LUTs. With the advent of X11R6, the X color management system (Xcms) architecture was incorporated, based upon work by Tektronix that expanded the previous simple solution, to provide a method of conversions between a plethora of device independent color spaces to display device dependent color. This solution focused on adding white point chromatic adaptation support and gamut compression support. X11r6 color management thus assumes a workflow that begins with three channel device independent colors and converts to display device dependent colors.

The X11r6 architecture thus has two color management solutions. The first solution is the simple 3×3 matrix and 3-1D LUTs that are commonly used to characterize simple display devices, such as CRTs. The second is Xcms, which consists primarily of a white point conversion and gamut compression. Since the introduction of Xcms, color management has advanced and found solutions limited to these two techniques are inadequate because most assume source and destination devices where X11 only supports a destination device and assumes the source is device independent.

Also, modem color management solutions based upon metadata device characterization profiles, such as the ICC, assume the workflow begins and ends with three, four or more channels of device dependent colors. Presently, X11 only enables a color management workflow that begins with three device independent colors and ends with RGB display device dependent colors. Modem color management solutions based upon standard color spaces, such as sRGB and scRGB, are similar to modem metadata solutions, except the metadata is contained within the device itself, so that the workflow appears to be completely device independent outside of the source and destination devices. Essentially the metadata converting between device colors and the standard color space exists only within the source and destination hardware itself. This allows for much simpler user experiences and exchange of color content in open networks and also allows complex workflows consisting of multiple applications or users.

Other prior art solutions that exist today do not presently integrate with X11R6 and are thus are limited to a single application. Accordingly, cut and paste, inter-application and complex workflows are very limited with present solutions. Moreover, present solutions are very limited with respect to supporting Cyan, Magenta, Yellow and blacK (CMYK) and other color spaces. Thus, there is a need for a mechanism that enables the standard X11r6 graphics platform to support the industry de facto metadata color management standard built around the ICC, sRGB and scRGB color management systems, respectively. There is still further a need for a mechanism that allows support for modem color management standards, such as ICC, sRGB and scRGB, which begin and end with device dependent colors.

SUMMARY OF THE INVENTION

In view of the foregoing, the present invention provides systems and methods for providing color management in connection with a variety of computing devices having different color display characteristics. More particularly, the invention provides means for enabling the X11 graphics platform to support color management systems, such as ICC, sRGB and scRGB, which begin and end with device dependent colors. The invention also provide means for supporting CMYK color spaces as well as extended RGB color spaces within X11r6, thus extending the X11r6 graphics platform to support any modern color management standard.

In various embodiments of the invention, methods, computer readable media and computing devices are provided in connection with color management systems. The embodiments include receiving device independent color data from source device(s) for translation to destination device(s), generating a device link profile representing color characteristic differential(s) between the source device(s) and the destination device(s), spoofing at least one application programming interface function of a color management system and invoking function to generate destination device dependent color values for destination device(s).

Other features and embodiments of the present invention are described below.

BRIEF DESCRIPTION OF THE DRAWINGS

The system and methods for providing color management in accordance with the present invention are further described with reference to the accompanying drawings in which:

FIGS. 1A and 1B illustrate some rudimentary aspects of the X protocol by the X Consortium.

FIG. 2B is a block diagram representing an exemplary non-limiting computing device in which the present invention may be implemented;

FIG. 3A illustrates exemplary operation of the X11R5 color management architecture;

FIG. 3B illustrates exemplary operation of the X11R6 color management architecture;

FIG. 4A illustrates further exemplary aspects of the X11R6 color management architecture;

FIG. 4B illustrates exemplary operation of the color management module (CMM) color management architecture;

FIG. 4C illustrates the color management architecture provided by the present invention.

DETAILED DESCRIPTION OF THE INVENTION

Overview

The invention thus provides methods and systems for implementing modem color management using a variety of presently adopted solutions within the architectural constraints of the X11r6 graphics platform. As mentioned, X11 assumes a color management workflow architecture that begins with three device independent colors and ends with RGB display device dependent colors. The invention thus provides a mechanism that allows support for modem color management such as ICC, sRGB and scRGB, which begins and ends with device dependent colors. The invention can also be used to support CMYK color spaces as well as extended RGB colors spaces within X11r6, thus extending the X11r6 graphics platform to support all modem color management techniques.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a color management process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local color management services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a color management process that may utilize the techniques of the present invention.

Figure 2A:
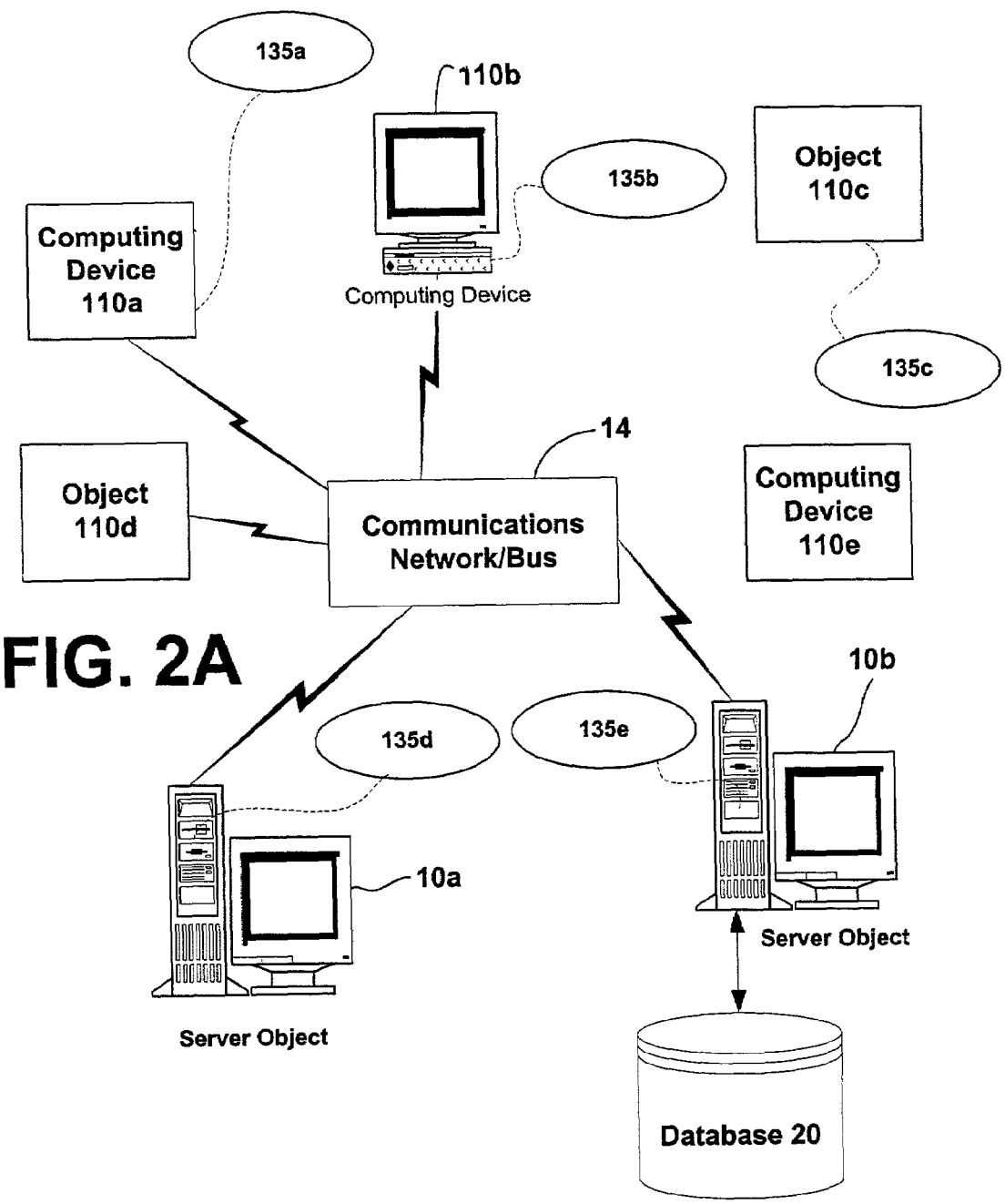
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 14. This network may itself comprise other computing objects and computing devices that provide services to the system of FIG. 2A. In accordance with an aspect of the invention, each object 10a, 10b, etc. or 110a, 110b, 110c, etc. may contain an application that might request color management services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Color management services in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s) or other color data may in practice be physically located in one or more locations, the ability to distribute color management services is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless, e.g., Home Radio Frequency (HomeRF) or 802.11b, or wired, e.g., Home Phoneline Networking Appliance (PNA), Cat 5, even power line, connectivity. Voice traffic may enter the home either as wired, e.g., Cat 3, or wireless, e.g., cell phones, and may be distributed within the home using Cat 3 wiring. Entertainment media, or other graphical data, may enter the home either through satellite or cable and is typically distributed in the home using coaxial cable IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to color management of graphics object(s) or other color data in accordance with the present invention.

Moreover, color is an effective means to represent a variety of physical or other phenomena, and thus whether the data be magnetic resonance imaging data, ultrasound data, graphics equalizing data, etc., color is often an appropriate way to present the data to humans for fast perceptual analysis. Accordingly, the source for color data as contemplated herein is limitless, and may undergo a series of transformations, prior to being considered "color" data.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a video cassette recorder (VCR), television (TV), oven, light, heater and the like in accordance with the present invention. It is thus contemplated that the present invention may apply to any computing device in connection with which it is desirable to process or display graphical object(s) or any other color data.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 10d, 110e, etc., as maybe characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing color object(s) or data or intermediate color object(s) or data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation of the color management techniques of the invention.

Although not required, the invention can be implemented via an operating system, for use by a developer of services for a device or object, and/or included within application software that operates in connection with the color management techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that color management services may be performed by, supported in or accessed via all of .NET's languages and services, and in other distributed computing frameworks as well.

Color Management in X11

As related in the background, the X11R6 color management system is a graphics protocol, which, via operations including white point adaptation, gamut mapping, matrix conversions and 1-D LUTs, supports color management functions that are pluginable and supports translation of device independent application content to device dependent color values.

The X11r6 architecture has two color management solutions. The first solution is the simple 3×3 matrix and 3-1D LUTs that are commonly used to characterize simple display devices, such as CRTs. The second is Xcms, which consists primarily of a white point conversion and gamut compression. Since the introduction of Xcms, color management has advanced and found solutions limited to these two techniques are inadequate because most assume source and destination devices where X11 only support a destination device and assumes the source is device independent. Fortunately, Xcms allows more flexible implementations within this architecture.

CIELAB is a system adopted by CIE in 1976 as a model that better showed uniform color spacing in their values than the previous CIELUV in terms of representing the human visual system (HVS). CIELAB is an opponent color system based on the earlier (1942) system of Richard Hunter called L, a, b. Color opposition correlates with discoveries in the mid-1960s that somewhere between the optical nerve and the brain, retinal color stimuli are translated into distinctions between light and dark, red and green, and blue and yellow. CIELAB indicates these values with three axes: L*, a* and b*. The full nomenclature is 1976 CIE L*a*b* Space.

The central vertical axis represents lightness, signified as L*, and values for lightness run from 0 (black) to 100 (white). The color axes are based on the fact that a color cannot be both red and green, or both blue and yellow, because these colors oppose each other. On each axis the values run from positive to negative. On the a–a' axis, positive values indicate amounts of red while negative values indicate amounts of green. On the b–b' axis, yellow is positive and blue is negative. For both axes, zero is neutral gray. The CIEXYZ data structure is a data structure utilized by X11, which contains the x, y and z coordinates of a specific color in a specified color space.

An example of how X11r5 works is illustrated in FIG. 3A, which assumes directcolor or truecolor surfaces in X11. From device independent RGB values, display device dependent, linear with respect to luminance, RGB values are produced via 3×3 matrix 300. Then, display device dependent non-linear RGB values are produced via 3 1-D LUTs 310 for a given gamma ($\gamma$) value, e.g., $\gamma=1.0$. These device dependent values are then reproduced via the display device 320. In this regard, the device 320 provides the 3×3 matrix and the 1-D LUTs specific to the display device 320.

Specifically, the X color space conversion context (XCCC) supports two generic pointers to functions, to CIEXYZ and from CIEXYZ. An example of how X11r6 works is illustrated in FIG. 3B. From device independent color values, e.g., CIELAB, CIELUV, CIEYxy, CIEXYZ, TekHVC, cmdpad, CIEXYZ values are produced via standard color space conversion mechanisms in the X11 library, Xlib. Then, device white point CIEXYZ values are produced via Xcms white point conversion component 330. Then, device gamut CIEXYZ values are produced via Xcms gamut compression conversion component 340. Device dependent RGB values are then produced, either as per the ZX11r5 mechanisms, discussed in part above, or via the from CIEXYZ mechanism of XCCC.

Thus, as illustrated in FIG. 4A, color management in the X platform is accomplished via the to CIEXYZ and from CIEXYZ functions, which act to produce X11 data structures, or convert X11 data structures to device dependent values.

Operation of the standard WINDOWS® color management module (CMM) is illustrated in FIG. 4B. From any of a variety of source device dependent color spaces and device profiles, the CMM can convert to device independent color space, e.g., ICC, sRGB and scRGB, via standard CMM functions. Then, via the destination device profile, the independent color space values are converted to the color space suited to the destination device.

As illustrated in FIG. 4C, the invention provides a mechanism that augments the to CIEXYZ and from CIEXYZ functions of XCCC with support provided by standard ICC profiles and color management methods.

To accomplish this, first, one, either explicitly via a user interface (UI) or implicitly via device association, specifies the appropriate source and destination profiles. From these two device profiles, one can use standard WINDOWS® CMM functions to create a device link profile that converts directly from source device to destination device, which takes care of the ultimate relation of the source device and destination device color characteristic differentials. The X11 architecture is brought into the process to achieve the passing of values from the source device to the destination device by causing the from CIEXYZ function pointer of X11 to point to a standard CMM based color conversion function that converts source to destination colors or images using the device link profile. Standard CMM support can be ported to X11 from the WINDOWS® Image Color Matching (ICM) interface or other ICC color management system interfaces.

Figure 5A:
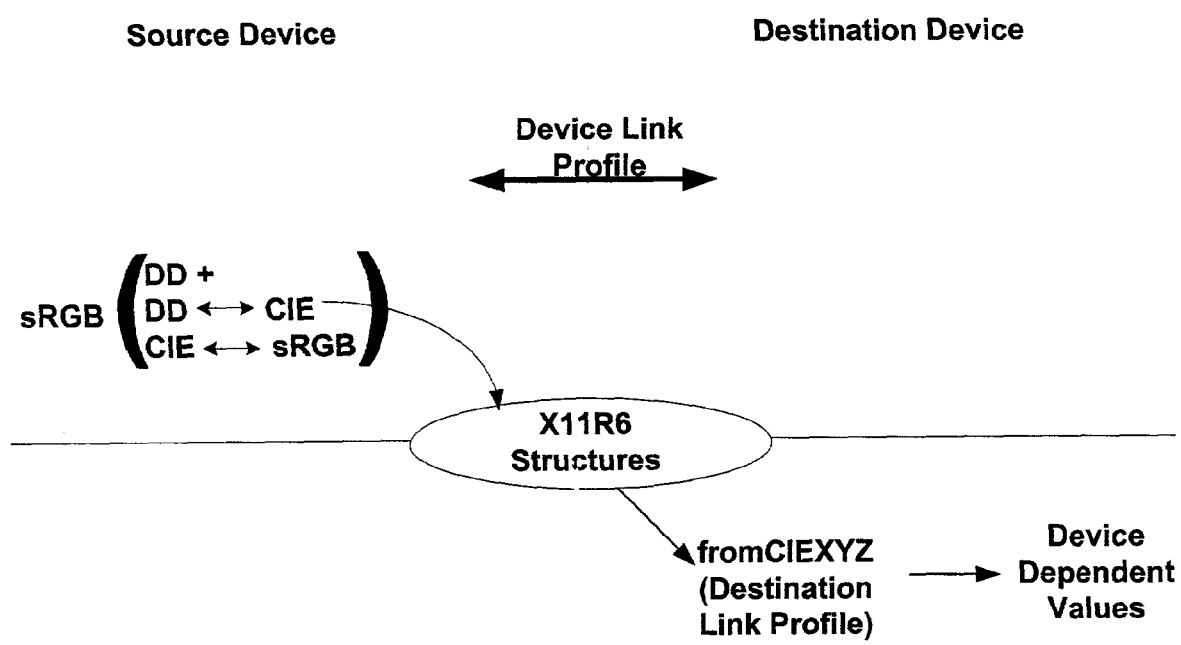
FIGS. 5A through 5C illustrate exemplary use of the present invention in connection with a variety of color spaces.
Figure 5B:
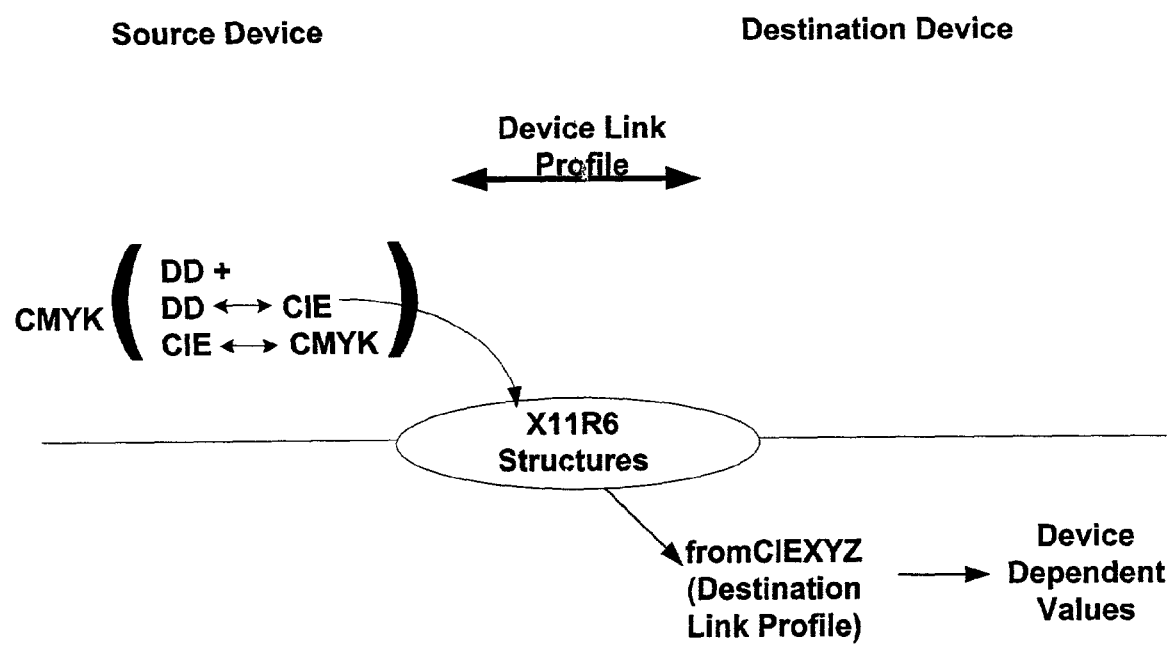
Figure 5C:
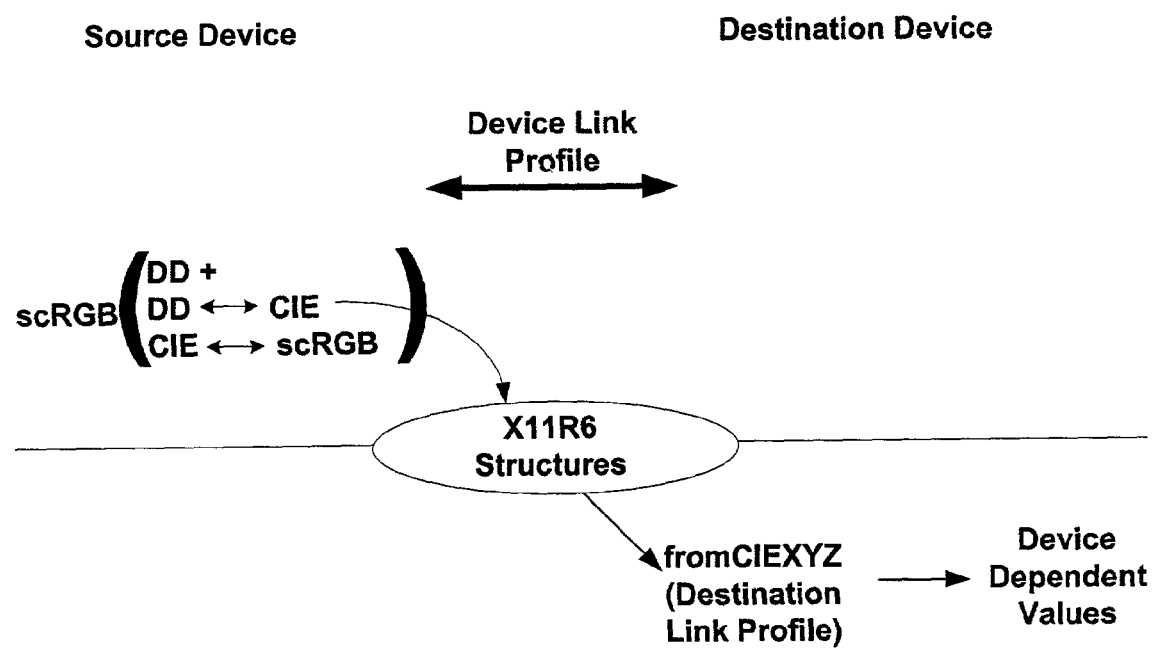

FIGS. 5A to 5C illustrate several examples of the invention. In these examples, the white point, gamut compression and other functions are defaulted to null operations for simplicity of description.

In FIG. 5A, RGB or sRGB source device color is present at the source device. After calculation of the device link profile between the source device and the destination device, the invention operates to fake the X system into assuming the source device RGB is CIEXYZ. Then, device dependent destination color is produced via the from CIEXYZ function, which includes the device link profile as an argument.

In FIG. 5B, CMYK source device color is present at the source device. After calculation of the device link profile between the source device and the destination device, the invention operates to fake the X system by assuming source device rgb is cmsPad XcmsColor type. Then, device dependent destination color is produced via the from CIEXYZ function, which includes the device link profile as an argument.

In FIG. 5C, scRGB source device color is present at the source device. After calculation of the device link profile between the source device and the destination device, device dependent destination color is produced via the from CIEXYZ function, which contains the device link profile. Alternatively, extended device dependent destination color is produced via the from CIEXYZ function, which contains the device link profile. In such a conversion, compensation is provided for the fact that Xcmscolors are unsigned shorts and scRGB is signed floats. Optionally, tonal compression can be separately accomplished via the additional 3 1-D LUTs.

Other color management solutions, such as RIMM RGB (EK/PIMA), ROMM RGB (EK/PIMA), esRGB (HP/PIMA) can be supported using the example of FIG. 5C above. In each of the above examples of the invention, the X functions from CIEXYZ and to CIEXYZ are faked or spoofed into receiving data from modem color management systems.

With respect to more detail regarding spoofing the APIs, two non-limiting alternatives are proposed herein. First, when moving from device independent application content to device dependent color values, the invention spoofs the from CIEXYZ function to actually convert from device dependent color values to CIEXYZ and then to use the 3×3 matrix and 1-D LUTs to characterize a specific output device. To convert from device dependent (dd) to device independent (di) values, this process is inverted and the to CIEXYZ API is spoofed instead.

Alternatively, when moving from device independent application content to device dependent color values, the invention spoofs the from CIEXYZ API to actually convert from device dependent color values to CIEXYZ, and then sets the 3×3 matrix to the identity matrix and sets the 1-D LUTs to identity LUTs to support complex destination devices that cannot be characterized with matrices and LUTs. To convert from device dependent (dd) to device independent (di) values, this process is inverted and the to CIEXYZ API is spoofed instead.

As utilized herein, "spoof from CIEXYZ,", or "spoof to CIEXYZ", means replace the pointer to the protocol default supplied function with a custom function that actually calls into the ICC compatible color management module and converts colors from dd to di or dd to dd.

As mentioned above, while exemplary embodiments of the present invention have been described in connection with various computing devices and network architectures, the underlying concepts may be applied to any computing device or system in which it is desirable to color management. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent color management achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for providing color management, comprising:
   receiving device independent color data from at least one source device for translation to at least one destination device;
   generating a device link profile representing at least one color characteristic differential between said at least one source device and said at least one destination device;
   spoofing at least one application programming interface function of a color management system by providing the device link profile to the at least one application programming interface function; and
   invoking said at least one application programming interface function to generate destination device dependent color values for said at least one destination device.

2. A method according to claim 1, wherein said spoofing includes spoofing at least one X11 application programming interface function.

3. A method according to claim 2, wherein said spoofing includes spoofing at least one member of a group comprising a toCIEXYZ function and a fromCIEXYZ function.

4. A method according to claim 1, wherein said at least one source device and said at least one destination device include at least one member of a group comprising a computing device and a software object.

5. A method according to claim 1, further including: invoking at least one function of a second color management system.

6. A method according to claim 5, wherein said invoking at least one function of a second color management system includes invoking Color Management Modules (CMM).

7. A method according to claim 1, wherein said device independent color data includes at least one member of group comprising standard color space (sRGB) data, standard extended color space (scRGB) data, International Color Consortium (ICC) profile data and Cyan, Magenta, Yellow and blacK (CMYK) data.

8. A method according to claim 1, wherein said device independent color data includes at least one member of group comprising scRGB, RIMM RGB (EK/PIMA), ROMM RGB (EK/PIMA) and esRGB (HP/PIMA) color data.

9. A method according to claim 8, further including converting signed floating point numbers to unsigned shorts.

10. A method according to claim 8, wherein said invoking includes providing tonal compression via 3 1-D Look Up Tables (LUTs) in the device link profile.

11. A method according to claim 1, wherein said spoofing includes:
   spoofing the at least one application programming interface function to convert from device dependent color values to CIEXYZ values; and
   one of (1) utilizing a 3×3 matrix and 1-D Look Up Tables (LUTs) in the device link profile to characterize a specific output device and (2) setting the 3×3 matrix of the device link profile to the identity matrix and setting the 1-D LUTs of the device link profile to identity LUTs.

12. A method according to claim 1, wherein said method is inverted and instead converts device dependent color values to device independent values, and said spoofing includes spoofing the toCIEXYZ function of the application programming interface.

13. A method according to claim 1, wherein said spoofing includes replacing a pointer to the protocol default supplied to said at least one application programming interface function with a custom function that invokes an ICC compatible color management module.

14. At least one member of a group comprising an operating system, driver code, an application programming interface, a tool kit and a coprocessing device for providing the color management of claim 1.

15. A modulated data signal carrying computer executable instructions for performing the method of claim 1.

16. A computing device comprising means for performing the method of claim 1.

17. A computer readable medium for providing color management having stored thereon computer executable instructions for performing a method, the method comprising:
   receiving device independent color data from at least one source device for translation to at least one destination device;

generating a device link profile representing at least one color characteristic differential between said at least one source device and said at least one destination device;

spoofing at least one application programming interface function of a color management system by providing the device link profile to the at least one application programming interface function; and invoking said at least one application programming interface function to generate destination device dependent color values for said at least one destination device.

18. A computer readable medium according to claim 17, wherein said spoofing includes spoofing at least one X11 application programming interface function.

19. A computer readable medium according to claim 18, wherein said spoofing includes spoofing at least one member of a group comprising a toCIEXYZ function and the a fromCIEXYZ function.

20. A computer readable medium according to claim 17, wherein said at least one source device and said at least one destination device include at least one member of a group comprising a computing device and a software object.

21. A computer readable medium according to claim 17, further including:

invoking at least one function of a second color management system.

22. A computer readable medium according to claim 21, wherein said invoking at least one function of a second color management system includes invoking Color Management Modules (CMM).

23. A computer readable medium according to claim 17, wherein said device independent color data includes at least one member of a group comprising standard color space (sRGB) data, standard extended color space (scRGB) data, International Color Consortium (ICC) profile data and Cyan, Magenta, Yellow and blacK (CMYK) data.

24. A computer readable medium according to claim 17, wherein said device independent color data includes at least one member of a group comprising scRGB, RIMM RGB (EK/PIMA), ROMM RGB (EK/PIMA) and esRGB (HP/PIMA) color data.

25. A computer readable medium according to claim 24, further including converting signed floating point numbers to unsigned shorts.

26. A computer readable medium according to claim 24, wherein said invoking includes providing tonal compression via 3 1-D Look Up Tables (LUTs) in the device link profile.

27. A computer readable medium according to claim 17, wherein said spoofing includes:

spoofing the at least one application programming interface function to convert from device dependent color values to CIEXYZ values; and one of (1) utilizing a 3×3 matrix and 1-D Look Up Tables (LUTs) in the device link profile to characterize a specific output device and (2) setting the 3×3 matrix of the device link profile to the identity matrix and setting the 1-D LUTs of the device link profile to identity LUTs.

28. A computer readable medium according to claim 17, wherein the operation of said method is inverted and instead said method converts device dependent color values to device independent values, and said spoofing includes spoofing the toCIEXYZ function of the application programming interface.

29. A computer readable medium according to claim 17, wherein said spoofing includes replacing a pointer to the protocol default supplied to said at least one application programming interface function with a custom function that invokes an ICC compatible color management module.

30. A computing device for use in connection with color management, comprising:

an input component that receives device independent color data from at least one source device for translation to at least one destination device;

a processing component that generates a device link profile representing at least one color characteristic differential between said at least one source device and said at least one destination device;

a spoof component that spoofs at least one application programming interface function of a color management system by providing the device link profile to the at least one application programming interface function; and an output component that invokes said at least one application programming interface function to generate destination device dependent color values for said at least one destination device.

31. A computing device according to claim 30, wherein said spoof component spoofs at least one X11 application programming interface function.

32. A computing device according to claim 31, wherein said spoof component spoofs at least one member of a group comprising a toCIEXYZ function and a fromCIEXYZ function.

33. A computing device according to claim 30, wherein said at least one source device and said at least one destination device include at least one member of a group comprising a computing device and a software object.

34. A computing device according to claim 30, further including: an invocation component that invokes at least one function of a second color management system.

35. A computing device according to claim 34, wherein said invocation component that invokes at least one function of a second color management system includes invoking Color Management Modules (CMM).

36. A computing device according to claim 30, wherein said device independent color data includes at least one member of a group comprising standard color space (sRGB) data, standard extended color space (scRGB) data, International Color Consortium (ICC) profile data and Cyan, Magenta, Yellow and blacK (CMYK) data.

37. A computing device according to claim 30, wherein said device independent color data includes at least one member of a group comprising scRGB, RIMM RGB (EK/PIMA), ROMM RGB (EK/PIMA) and esRGB (HP/PIMA) color data.

38. A computing device according to claim 37, further including a conversion component that converts signed floating point numbers to unsigned shorts.

39. A computing device according to claim 37, wherein said invocation component provides tonal compression via 3 1-D Look Up Tables (LUTs) in the device link profile.

40. A computing device according to claim 30, wherein said spoof component spoofs the at least one application programming interface function to convert from device dependent color values to CIEXYZ values, and one of (1) utilizes a 3×3 matrix and 1-D Look Up Tables (LUTs) in the device link profile to characterize a specific output device and (2) sets the 3×3 matrix of the device link profile to the identity matrix and sets the 1-D LUTs of the device link profile to identity LUTs.

41. A computing device according to claim 30, wherein the operation of said components is inverted and instead said components convert device dependent color values to device independent values, and said spoof component spoofs the toCIEXYZ function of the application programming interface.

42. A computing device according to claim 30, wherein said spoof component replaces a pointer to the protocol default supplied to said at least one application programming interface function with a custom function that invokes an ICC compatible color management module.

43. A method for providing color management, comprising:
   receiving device independent color data from at least one source device for translation to at least one destination device;
   generating a device link profile representing at least one color characteristic differential between said at least one source device and said at least one destination device;
   spoofing at least one X11 application programming interface function by spoofing at least one of member of a group comprising a toCIEXYZ function and a fromCIEXYZ function; and
   invoking said at least one X11 application programming interface function to generate destination device dependent color values for said at least one destination device.

44. A method according to claim 43, wherein said spoofing includes providing the device link profile to the at least one X11 application programming interface function.

45. A method according to claim 43, further including invoking at least one function of a Color Management Modules (CMM) system.

46. A method according to claim 43, wherein said spoofing includes:
   spoofing the at least one X11 application programming interface function to convert from device dependent color values to CIEXYZ values; and
   one of (1) utilizing a 3×3 matrix and 1-D Look Up Tables (LUTs) in the device link profile to characterize a specific output device and (2) setting the 3×3 matrix of the device link profile to the identity matrix and setting the 1-D LUTs of the device link profile to identity LUTs.

47. A method according to claim 43, wherein said method is inverted and instead converts device dependent color values to device independent values, and said spoofing includes spoofing the toCIEXYZ function of the X11 application programming interface.

48. A method according to claim 43, wherein said spoofing includes replacing a pointer to the protocol default supplied to said at least one X11 application programming interface function with a custom function.

49. At least one computer readable medium for providing color management having stored thereon a plurality of computer-executable modules comprising computer executable instructions, the modules comprising:
   means for receiving device independent color data from at least one source device for translation to at least one destination device;
   means for generating a device link profile representing at least one color characteristic differential between said at least one source device and said at least one destination device;
   means for spoofing at least one application programming interface function of a color management system by spoofing at least one of member of a group comprising a toCIEXYZ function and a fromCIEXYZ function; and
   means for invoking said at least one application programming interface function to generate destination device dependent color values for said at least one destination device.

50. At least one computer readable medium according to claim 49, wherein said means for spoofing spoofs at least one X11 application programming interface function.

51. A computing device for use in connection with color management, comprising:
   means for receiving device independent color data from at least one source device for translation to at least one destination device;
   means for generating a device link profile representing at least one color characteristic differential between said at least one source device and said at least one destination device;
   means for spoofing at least one application programming interface function of a color management system by spoofing at least one of member of a group comprising a toCIEXYZ function and a fromCIEXYZ function; and
   means for invoking said at least one application programming interface function to generate destination device dependent color values for said at least one destination device.

52. A computing device according to claim 51, wherein said means for spoofing spoofs at least one X11 application programming interface function.

* * * * *